(12) United States Patent
Ouderkirk et al.

(10) Patent No.: US 10,497,320 B1
(45) Date of Patent: Dec. 3, 2019

(54) TRANSPARENT AND REFLECTIVE ILLUMINATION SOURCE

(71) Applicant: Facebook Technologies, LLC, Menlo Park, CA (US)

(72) Inventors: Andrew John Ouderkirk, Redmond, WA (US); Robin Sharma, Redmond, WA (US); Jacques Gollier, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 80 days.

(21) Appl. No.: 15/973,494

(22) Filed: May 7, 2018

(51) Int. Cl.
| | | |
|---|---|---|
| *G02B 27/14* | (2006.01) |
| *G02B 27/22* | (2018.01) |
| *G03H 1/00* | (2006.01) |
| *H04N 7/00* | (2011.01) |
| *G09G 5/00* | (2006.01) |
| *G02F 1/1335* | (2006.01) |
| *G09G 3/34* | (2006.01) |
| *G06F 3/01* | (2006.01) |
| *F21V 7/00* | (2006.01) |
| *F21V 9/00* | (2018.01) |
| *F21V 9/14* | (2006.01) |
| *F21V 7/04* | (2006.01) |
| *F21Y 115/10* | (2016.01) |

(52) U.S. Cl.
CPC ......... *G09G 3/3406* (2013.01); *F21V 7/0008* (2013.01); *F21V 7/04* (2013.01); *F21V 9/00* (2013.01); *F21V 9/14* (2013.01); *G06F 3/013* (2013.01); *F21Y 2115/10* (2016.08)

(58) Field of Classification Search
CPC ............ G02B 27/0172; G02B 27/0101; G02B 2027/0178; G02B 2027/0132; G02B 2027/011; G02B 27/01; A61B 3/032; A61B 3/103; A61B 3/1015; A61B 3/14; A61B 3/113; A61B 3/1208; A61B 3/1225; A61B 3/024
USPC ........ 359/630–636, 409–410, 462, 466, 639, 359/626, 13–14, 404, 407; 351/243, 200, 351/239, 246, 205–206, 210–211, 218, 351/220–223; 348/115; 345/7, 9, 156; 349/11; 701/1; 310/49 R, 156.35, 310/266–268, 156.02; 340/438, 980, 340/995.1, 815.47, 815.74
See application file for complete search history.

(56) References Cited

U.S. PATENT DOCUMENTS 5,033,824 A * 7/1991 Bohmer ................. G01R 13/40
345/50

* cited by examiner

*Primary Examiner* — Dawayne Pinkney
(74) *Attorney, Agent, or Firm* — Fenwick & West LLP (57) ABSTRACT

A head-mounted display (HMD) includes a display illuminated by one or more illumination sources. An illumination source is coupled to a partially transparent circuit board and is configured to emit light onto a compound mirror. The compound mirror is farther from an exit pupil of the HMD than the display and reflects light from the illumination source back towards the exit pupil of the HMD. Light reflected by the compound mirror is transmitted through the partially transparent circuit board onto the display, illuminating the display.

20 Claims, 4 Drawing Sheets

TRANSPARENT AND REFLECTIVE ILLUMINATION SOURCE

BACKGROUND

The present disclosure generally relates to head mounted displays presenting content to users, and specifically to an illumination source inclusion in a head mounted display to illuminate a user's eye.

Head mounted displays (HMDs) may present various types of content to users. For example, a HMD presents virtual environments to users. When presenting content to a user via a HMD, a system may track position or gaze of a user's eye within the HMD to improve content presented to the user. For example, content presented by the HMD may be foveated, which reduces resolution of presented content that is outside an area where the user's eyes' are focused within the HMD. Similarly, resolution of content within the area where the user's eyes' are focused within the HMD is increased. In another example, content outside of the area where the user's eyes' are focused within the HMD is more highly compressed than content within the area where the user's eyes' are focused within the HMD.

To determine where a user's eyes' are focused within a HMD, a camera of other imaging device is often included in the HMD adjacent to imaging optics, or a hot mirror that is transparent to visible light, but reflective to infrared light used by the imaging device is positioned between the user's eyes and a display within the HMD. However, as fields of view of content resented by virtual reality, mixed reality, or augmented reality systems increase and distances between the user's eyes and the display within the HMD decrease, conventional approaches to identifying pupils of a user's eyes to determine the user's focal become increasingly difficult. While positioning an imaging device behind the display of the HMD would offset some difficulties with such conventional approaches, conventional backlights used with displays, such as liquid crystal displays, scatter and refract light, preventing an imaging device positioned behind the display from capturing images of the user's eye suitable for identifying the pupil of the user's eye.

SUMMARY

A head mounted display (HMD) presenting content to a user includes a display that is illuminated by one or more reflective illumination sources. The display and one or more reflective illumination sources are included in a front rigid body of the HMD that includes an exit pupil as a location where a user's eye is positioned. The display that obtains and presents the content to the user. For example, the display is a liquid crystal display.

To illuminate the display, a reflective illumination source includes an illumination source coupled to a partially transparent circuit board, as well as a compound mirror. The illumination source, the partially transparent circuit board, and the compound mirror are positioned farther from an exit pupil of the front rigid body of the HMD than the display. For example, the illumination source, the partially transparent circuit board, and the compound mirror are positioned nearer to a front side of the HMD than the display. Hence, from the exit pupil 330 of the front rigid body of the HMD the illumination source, the partially transparent circuit board, and the compound mirror are behind the display.

The illumination source is configured to emit light onto the compound mirror. In different embodiments, any type of illumination source may be used. Example illumination sources 310 include a light emitting diode (LED), an organic light emitting diode (OLED), a laser diode, a vertical-cavity surface-emitting laser (VCSEL), a super radiant source, and a reflector included in a waveguide. The illumination source is coupled to the partially transparent circuit board, which is nearer to the display than the illumination source. The partially transparent circuit board includes a transparent substrate, such as glass or plastic, and circuit traces coupling components. In various embodiments, ratios of heights to widths of each circuit trace equal or exceed a threshold value.

The illumination source emits light onto the compound mirror, which is farther from the exit pupil of the HMD than the display and is positioned a distance from the illumination source. The compound mirror is a mirrored surface having curvature in two orthogonal axes. In various embodiments, the curvature in one or more axes is spherical or aspherical. In various embodiments, the compound mirror may be a metal mirror or an interference mirror. Additionally, the compound mirror transmits certain wavelengths of light incident on the compound mirror, while reflecting other wavelengths of light incident on the compound mirror. For example, the compound mirror reflects visible light incident on the compound mirror, but transmits at least 50% of infrared light (e.g., light having a wavelength of 850 nm) incident on the compound mirror. Light emitted by the illumination source is incident on the compound mirror, which reflects the incident light to form a ray of light that is directed towards the illumination source and the partially transparent circuit board. The ray of light is transmitted by the partially transparent circuit board towards the display.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
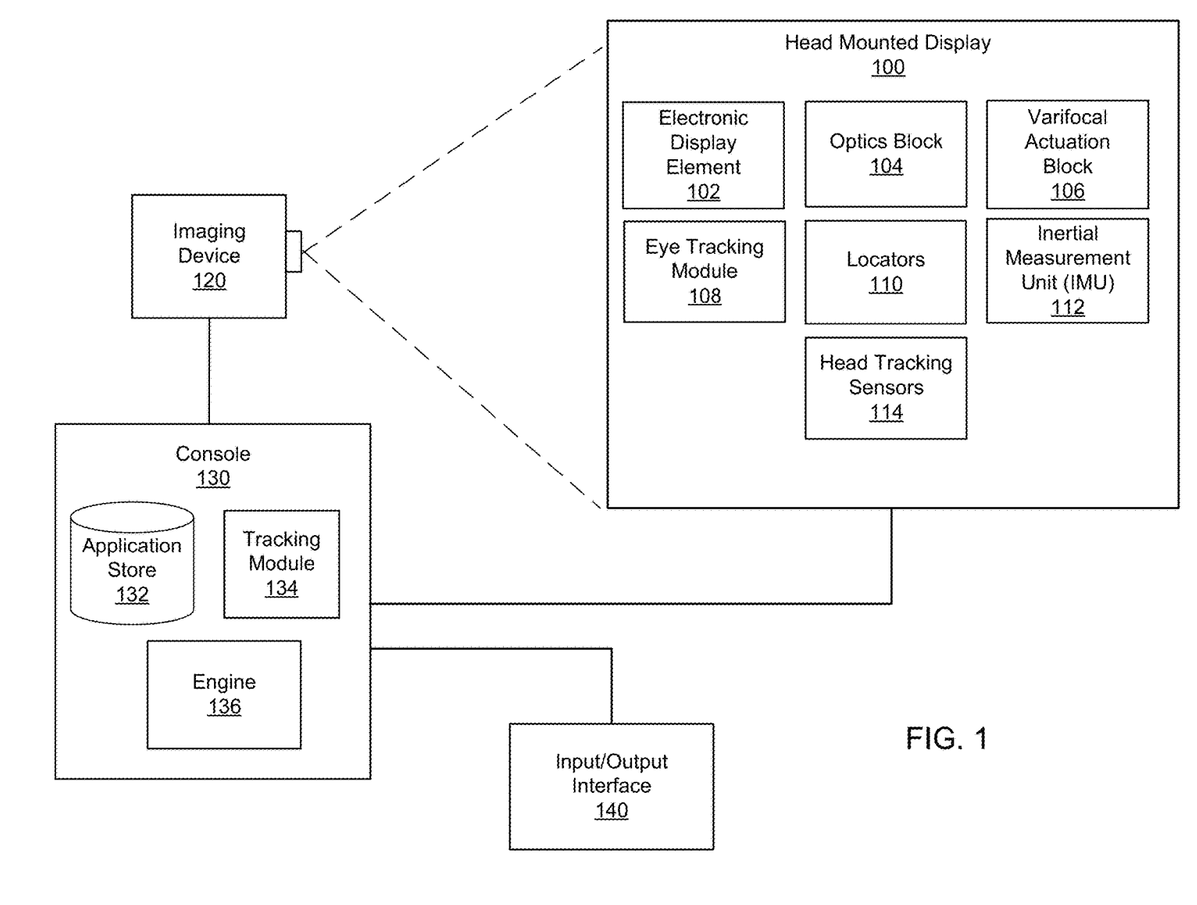
FIG. 1 shows an example system environment including a head mounted display (HMD) presenting content, in accordance with at least one embodiment.

FIG. 1 is a system environment in which a head mounted display (HMD) 100 operates. In this example, the system environment includes the HMD 100, an input/output interface 140, which are each coupled to a console 130. While FIG. 1 shows a single HMD 100, a single imaging device 120, and a single VR input/output interface 140, in other embodiments, any number of these components may be included in the system. For example, there may be multiple HMDs 100 each having an associated input/output interface 140 and being monitored by one or more imaging devices 120, with each HMD 100, input/output interface 140, and imaging device 120 communicating with the console 130. In alternative configurations, different and/or additional components may also be included in the system environment.

The HMD 100 presents content to a user. Example content includes images, video, audio, or some combination thereof. Audio content may be presented via a separate device (e.g., speakers and/or headphones) external to the HMD 100 that receives audio information from the HMD 100, the console 130, or both. The HMD 100 shown in FIG. 1 includes an electronic display element 102, an optics block 104, a varifocal actuation block 106, an eye tracking module 108, one or more locators 110, an internal measurement unit (IMU) 112, and one or more head tracking sensors 114.

The optics block 104 directs light from the electronic display element 102, further described below in conjunction with FIGS. 3 and 4, to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 104 may have one or more coatings, such as anti-reflective coatings. Magnification of the image light by the optics block 104 allows the electronic display element 102 to be physically smaller, to weigh less, and to consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

In various embodiments, the optics block 104 is designed to correct one or more optical errors. Examples of optical errors include: barrel distortion, pincushion distortion, longitudinal chromatic aberration, transverse chromatic aberration, spherical aberration, comatic aberration, field curvature, astigmatism, and so forth. In some embodiments, content provided to the electronic display element 102 for display is pre-distorted, and the optics block 104 corrects the distortion when it receives image light from the electronic display element 102 generated based on the content.

The varifocal actuation block 106 includes a varifocal element causing the optics block 104 to vary the focal length (or optical power) of HMD 100 to keep a user's eyes in a zone of comfort as vergence and accommodation change. In one embodiment, the varifocal actuation block 106 physically changes a distance between the electronic display element 102 and the optical block 104 by moving the electronic display element 102 or the optical block 104 (or both). Alternatively, the varifocal actuation block 106 changes the focal length of the optics block 104 by adjusting one or more properties of one or more lenses. Example properties of a lens adjusted by the varifocal actuation block include: an optical path length, an index of refraction of a lens medium, a shape of a lens, and so forth. For example, the varifocal actuation block 106 changes the focal length of the one or more lenses using shape-changing polymer lenses, electrowetting methods with liquid lenses, Alvarez-Lohmann lenses, deformable membrane mirrors, liquid crystal (electroactive) lenses, or phase-only spatial light modulators (SLMs), or any other suitable component. Additionally, moving or translating two lenses relative to each other may also be used to change the focal length of the HMD 100. Thus, the varifocal actuation block 106 may include actuators or motors that move the electronic display element 102 or the optical block 104 on a track to change the distance between them or may include actuators and other components or mechanisms for changing the properties of one or more lenses included in the optics block 104. The varifocal actuation block 106 may be separate from or integrated into the optics block 104 in various embodiments.

In some embodiments, different states of the optics block 104 correspond to different focal lengths of the HMD 100 or to a combination of the focal length and eye position relative to the optics block 104. In operation, the optics block 104 may move in a range of ~5 mm with a positional accuracy of ~5 μm for a granularity of around 1000 focal lengths, corresponding to 1000 states of the optics block 104. Any number of states could be provided; however, a limited number of states accommodate the sensitivity of the human eye, allowing some embodiments to include fewer focal lengths. For example, a first state corresponds to a focal length of a theoretical infinity meters (0 diopter), a second state corresponds to a focal length of 2.0 meters (0.5 diopter), a third state corresponds to a focal length of 1.0 meters (1 diopter), a fourth state corresponds to a focal length of 0.5 meters (1 diopter), a fifth state corresponds to a focal length of 0.333 meters (3 diopter), and a sixth state corresponds to a focal length of 0.250 meters (4 diopter). The varifocal actuation block 106, thus, sets and changes the state of the optics block 104 to achieve a desired focal length.

The eye tracking module 108 tracks an eye position and eye movement of a user of the HMD 100. A camera or other optical sensor inside the HMD 100 captures image information of a user's eyes, and eye tracking module 108 uses the captured information to determine interpupillary distance, interocular distance, a three-dimensional (3D) position of each eye relative to the HMD 100 (e.g., for distortion adjustment purposes), including a magnitude of torsion and rotation (i.e., roll, pitch, and yaw) and gaze directions for each eye. In one example, infrared light is emitted within the HMD 100 and reflected from each eye. The reflected light is received or detected by the camera and analyzed to extract eye rotation from changes in the infrared light reflected by each eye. Many methods for tracking the eyes of a user can be used by the eye tracking module 108. Accordingly, the eye tracking module 108 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 108 integrates information from past measurements, measurements identifying a position of a user's head, and 3D information describing a scene presented by the electronic display element 102. Thus, information for the position and orientation of the user's eyes is used to determine the gaze point in a virtual scene presented by the HMD 100 where the user is looking.

Based on information from the eye tracking module 108, the varifocal actuation block 106 determines a vergence depth of a user's gaze based on the gaze point or an estimated intersection of the gaze lines determined by the eye tracking module 108. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the varifocal actuation block 106 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused and a depth from the user's eyes at which the eyes are focused, thereby, providing information, such as an object or plane of focus, for rendering adjustments to the virtual scene.

In some embodiments, rather than provide accommodation for the eye at a determined vergence depth, accommodation may be directly determined by a wavefront sensor, such as a Shack-Hartmann wavefront sensor; hence, a state of the optics block 104 may be a function of the vergence or accommodation depth and the 3D position of each eye, so the optics block 104 brings objects in a scene presented by electronic display element 102 into focus for a user viewing the scene. Further, vergence and accommodation information may be combined to focus optics block 104 and to render synthetic depth of field blur.

Locators 110 are objects located in specific positions on the HMD 100 relative to one another and relative to a specific reference point on the HMD 100. A locator 110 may be a light emitting diode (LED), a corner cube reflector, a reflective marker, a type of light source that contrasts with an environment in which the HMD 100 operates, or some combination thereof. Active locators 110 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In various embodiments, locators 110 are located beneath an outer surface of the HMD 100, which is transparent to the wavelengths of light emitted or reflected by locators 110 or is thin enough not to substantially attenuate the wavelengths of light emitted or reflected by locators 110. Further, the outer surface or other portions of the HMD 100 can be opaque in the visible band of wavelengths of light. Thus, the locators 110 may emit light in the IR band while under an outer surface of the HMD 100 that is transparent in the IR band but opaque in the visible band.

The inertial measurement unit (IMU) 112 is an electronic device that generates fast calibration data based on measurement signals received from one or more head tracking sensors 114, which generate one or more measurement signals in response to motion of the HMD 100. Examples of head tracking sensors 114 include accelerometers, gyroscopes, magnetometers, other sensors suitable for detecting motion, correcting error associated with the IMU 112, or some combination thereof. Head tracking sensors 118 may be located external to the IMU 112, internal to the IMU 112, or some combination thereof.

Based on the measurement signals from the head tracking sensors 118, the IMU 112 generates fast calibration data indicating an estimated position of the HMD 100 relative to an initial position of the HMD 100. For example, head tracking sensors 118 include multiple accelerometers to measure translational motion (forward/back, up/down, left/right) and multiple gyroscopes to measure rotational motion (e.g., pitch, yaw, and roll). The IMU 112 can, for example, rapidly sample the measurement signals and calculate the estimated position of the HMD 100 from the sampled data. For example, the IMU 112 integrates measurement signals received from the accelerometers over time to estimate a velocity vector and integrates the velocity vector over time to determine an estimated position of a reference point on the HMD 100. The reference point is a point that may be used to describe the position of the HMD 100. While the reference point may generally be defined as a point in space, in various embodiments, reference point is defined as a point within the HMD 100 (e.g., a center of the IMU 112). Alternatively, the IMU 112 provides the sampled measurement signals to the console 130, which determines the fast calibration data.

The IMU 112 can additionally receive one or more calibration parameters from the console 130. As further discussed below, the one or more calibration parameters are used to maintain tracking of the HMD 100. Based on a received calibration parameter, the IMU 112 may adjust one or more IMU parameters (e.g., sample rate). In some embodiments, certain calibration parameters cause the IMU 112 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The imaging device 120 generates slow calibration data in accordance with calibration parameters received from the console 130. Slow calibration data includes one or more images showing observed positions of locators 110 that are detectable by the imaging device 120. In various embodiments, the imaging device 120 may include one or more cameras, one or more video cameras, other devices capable of capturing images including one or more locators 110, or some combination thereof. Additionally, the imaging device 120 may include one or more filters (e.g., for increasing signal to noise ratio). The Imaging device 120 is configured to detect light emitted or reflected from locators 110 in a field of view of the imaging device 120. In embodiments where locators 110 include passive elements (e.g., a retroreflector), the imaging device 120 may include a light source that illuminates some of or all of the locators 110, which retro-reflect the light towards the light source in imaging device 120. Slow calibration data is communicated from the imaging device 120 to the console 130, and the imaging device 120 receives one or more calibration parameters from the console 130 to adjust one or more imaging parameters (e.g., focal length, focus, frame rate, ISO, sensor temperature, shutter speed, aperture, etc.).

The input/output interface 140 is a device that allows a user to send action requests to the console 130. An action request is a request to perform a particular action. For example, an action request may be to start or end an application or to perform a particular action within the application. The input/output interface 140 may include one or more input devices. Example input devices include a keyboard, a mouse, a game controller, or any other suitable device for receiving action requests and communicating the received action requests to the console 130. An action request received by the input/output interface 140 is communicated to the console 130, which performs an action corresponding to the action request. In some embodiments, the input/output interface 140 may provide haptic feedback to the user in accordance with instructions received from the console 130. For example, haptic feedback is provided by the input/output interface 140 when an action request is received, or the console 130 communicates instructions to the input/output interface 140 causing the input/output interface 140 to generate haptic feedback when the console 130 performs an action.

The console 130 provides content to the HMD 100 for presentation to the user in accordance with information received from the imaging device 120, the HMD 100, or the input/output interface 140. In the example shown in FIG. 1, the console 130 includes an application store 122, a tracking module 134, and an engine 136. Some embodiments of the console 130 have different or additional modules than those described in conjunction with FIG. 1. Similarly, the functions further described below may be distributed among components of the console 130 in a different manner than is described here.

The application store 132 stores one or more applications for execution by the console 130. An application is a group of instructions, that when executed by a processor, generates content for presentation to the user. Content generated by an application may be in response to inputs received from the user via movement of the HMD 100 or via the input/output interface 140. Examples of applications include gaming applications, conferencing applications, video playback application, or other suitable applications.

The tracking module 134 calibrates the system environment using one or more calibration parameters and may adjust one or more calibration parameters to reduce error in determining position of the HMD 100. For example, the tracking module 134 adjusts the focus of the imaging device 120 to obtain a more accurate position for observed locators 110 on the HMD 100. Moreover, calibration performed by the tracking module 134 also accounts for information received from the IMU 112. Additionally, if tracking of the HMD 100 is lost (e.g., the imaging device 120 loses line of sight of at least a threshold number of the locators 110), the tracking module 134 re-calibrates some or all of the system environment components.

Additionally, the tracking module 134 tracks the movement of the HMD 100 using slow calibration information from the imaging device 120 and determines positions of a reference point on the HMD 100 using observed locators from the slow calibration information and a model of the HMD 100. The tracking module 134 also determines positions of the reference point on the HMD 100 using position information from the fast calibration information from the IMU 112 on the HMD 100. Additionally, the tracking module 134 may use portions of the fast calibration information, the slow calibration information, or some combination thereof, to predict a future location of the HMD 100, which is provided to the engine 136.

The engine 136 executes applications within the system environment and receives position information, acceleration information, velocity information, predicted future positions, or some combination thereof for the HMD 100 from the tracking module 134. Based on the received information, the engine 136 determines content to provide to the HMD 100 for presentation to the user, such as a virtual scene. For example, if the received information indicates that the user has looked to the left, the engine 136 generates content for the HMD 100 that mirrors or tracks the user's movement in a virtual environment. Additionally, the engine 136 performs an action within an application executing on the console 130 in response to an action request received from the input/output interface 140 and provides feedback to the user that the action was performed. The provided feedback may be visual or audible feedback via the HMD 100 or haptic feedback via the input/output interface 140.

Figure 2:
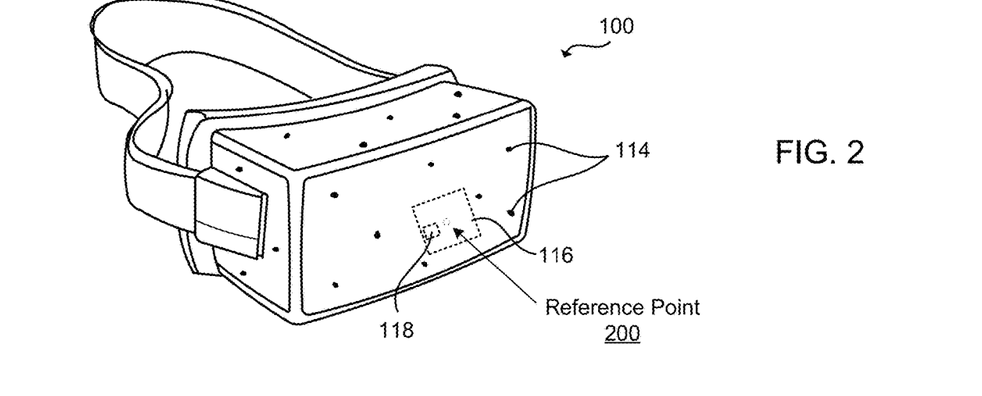
FIG. 2 shows a diagram of a head mounted display (HMD), in accordance with at least one embodiment.

FIG. 2 is a diagram of the head mounted display (HMD) 100, in accordance with at least one embodiment. In this example, the HMD 100 includes a front rigid body and a band that goes around a user's head. The front rigid body includes one or more electronic display elements corresponding to the electronic display element 102, the IMU 112, the head tracking sensors 114, and the locators 110. In this example, the head tracking sensors 114 are located within the IMU 112.

The locators 110 are located in fixed positions on the front rigid body relative to one another and relative to a reference point 200. In this example, the reference point 200 is located at the center of the IMU 112. Each of the locators 110 emits light that is detectable by the imaging device 120. Locators 110, or portions of locators 110, are located on a front side, a top side, a bottom side, a right side, and a left side of the front rigid body, as shown FIG. 2.

Reflective Lighting of a Display Included in a Head Mounted Display

Figure 3:
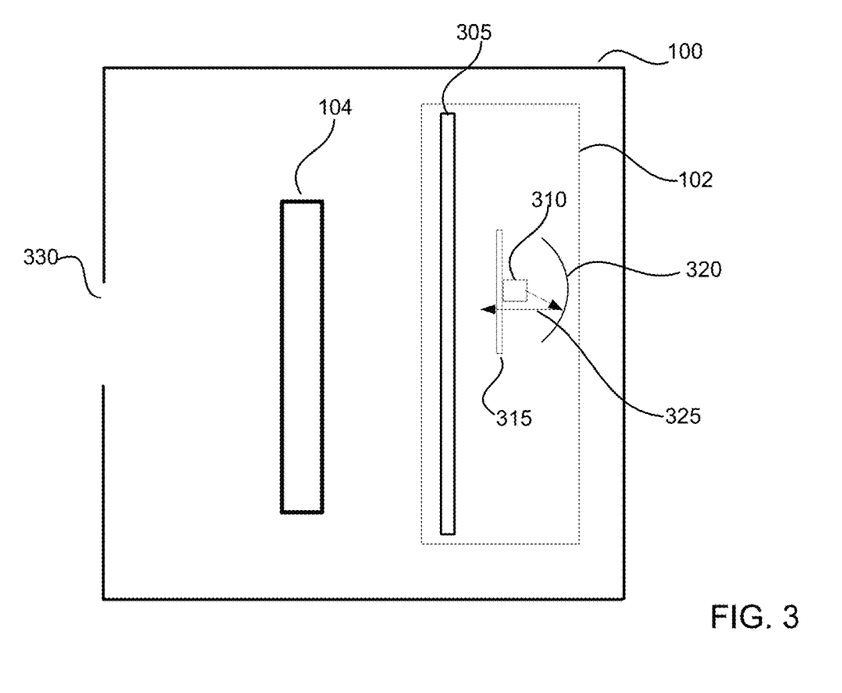
FIG. 3 is a cross-section of a front rigid body of a head mounted display (HMD) including an electronic display element including a reflective illumination source), in accordance with at least one embodiment.

FIG. 3 is a cross-section of a front rigid body of a head mounted display (HMD) 100 including an electronic display element 102 including a reflective illumination source. In the example of FIG. 3, the electronic display element 102 includes a display 305 that obtains content from the console 130 or from another source and presents the content. For example, the display 305 is a liquid crystal display. The electronic display element 102 also includes an illumination source 310 coupled to a partially transparent circuit board 315, as well as a compound mirror 320. However, in other embodiments, the electronic display element 102 may include different or additional components than those shown in conjunction with FIG. 3.

The illumination source 310, the partially transparent circuit board 315, and the compound mirror 320 are positioned farther from an exit pupil 330 of the front rigid body of the HMD 100 than the display 305. For example, the illumination source 310, the partially transparent circuit board 315, and the compound mirror 320 are positioned nearer to a front side of the HMD 100 than the display 305. Hence, from the exit pupil 330 of the front rigid body of the HMD 100 the illumination source 310, the partially transparent circuit board 315, and the compound mirror 320 are behind the display 305.

The illumination source 310 is configured to emit light onto the compound mirror 320. In different embodiments, any type of illumination source 310 may be used. Example illumination sources 310 include a light emitting diode (LED), an organic light emitting diode (OLED), a laser diode, a vertical-cavity surface-emitting laser (VCSEL), a super radiant source, and a reflector included in a waveguide. However, any suitable source of light may be used as an illumination source 310 in different embodiments.

The illumination source 310 is coupled to the partially transparent circuit board 315, which is nearer to the display 305 than the illumination source 310. The partially transparent circuit board 315 includes a transparent substrate, such as glass or plastic, and circuit traces coupling components. In various embodiments, the circuit traces have a high aspect ratio, with a ratio of a height of a circuit trace to a width of the circuit trace equaling or exceeding 0.25. However, in other embodiments, the ratio of the height of the circuit trace to the width of the circuit trace is at least 0.5. As another example, the ratio of the height of the circuit trace to the width of the circuit trace is at least 1.0, while in other examples the ratio of the height of the circuit trace to the width of the circuit trace is at least 1.5. In various embodiments, both a front surface and a rear surface of a circuit trace are highly reflective. Additionally, the partially transparent circuit board 315 includes one or more mounting pads to form a bond with and an electrical connection with the illumination source 310. A surface of a mounting pad nearest to the display 305 is highly reflective. Additionally, the surface of the mounting pad nearest to the display 305 is flat in various embodiments.

The illumination source 310 emits light onto the compound mirror 320, which is farther from the exit pupil 330 of the HMD 100 than the display 305 and is positioned a distance from the illumination source 310. The compound mirror 320 is a mirrored surface having curvature in two orthogonal axes. In various embodiments, the curvature in one or more axes is spherical or aspherical. An aspherical surface is a spherical surface modified with a conic, a polynomial aspherical surface, an anamorphic surface, a Zernike surface, or a free-form surface in different embodiments. The compound mirror 320 may also include a structure that controllably varies an angle of rays of light reflected by the compound mirror 320. Example structures for varying the angle of rays of light reflected by the compound mirror 320 include periodic variations in curvature, random structures, and coatings to controllably scatter light.

In various embodiments, the compound mirror 320 may be a metal mirror or an interference mirror. Example interference mirrors include those made by physical vapor deposition (PVD), sputtering, atomic layer deposition (ALD), polymer coatings, or polymer films. A coating of the compound mirror 320 reflects at least 50% of the light incident on the compound mirror 320 in various embodiments; in other embodiments, the coating of the compound mirror 320 reflects at least 90% of the light incident on the compound mirror 320. Additionally, the compound mirror 320 transmits certain wavelengths of light incident on the compound mirror 320, while reflecting other wavelengths of light incident on the compound mirror 320. For example, the compound mirror 320 reflects visible light incident on the compound mirror 320, but transmits at least 50% of infrared light (e.g., light having a wavelength of 850 nm) incident on the compound mirror 320. As another example, the compound mirror 320 reflects visible light incident on the compound mirror 320, but transmits at least 90% of infrared light (e.g., light having a wavelength of 850 nm) incident on the compound mirror 320.

Light emitted by the illumination source 310 is incident on the compound mirror 320, which reflects the incident light to form a ray 325 of light that is directed towards the illumination source 310 and the partially transparent circuit board 315. The ray of light 325 is transmitted by the partially transparent circuit board 315 towards the display 305. In some embodiments, a quarter-wave retarder is positioned between the illumination source 310 and the display 305, so the ray 325 of light transmitted through the partially transparent circuit board 315 passes through the quarter-wave retarder before reaching the display. Additionally or alternatively, a reflective polarizer 160 is positioned between the illumination source 310 and the display 305, so the ray 325 of light transmitted through the partially transparent circuit board 315 passes through the reflective polarizer before reaching the display 305. In some embodiments, both the quarter-wave retarder and the reflective polarizer are positioned between the display 305 and the partially transparent circuit board 315, so light transmitted through the partially transparent circuit board 315 passes through the quarter-wave retarder and the reflective polarizer before reaching the display 305.

Light from the display 305 is directed towards the exit pupil 330 of the front rigid body of the HMD 100 by the optics block 104, as further described above in conjunction with FIG. 1. The exit pupil 330 is the location of the front rigid body of the HMD 100 where an eye of the user is positioned when the user is wearing the HMD 100. In various embodiments, an image capture device, such as a camera, that is part of an eye tracking module 108 is positioned behind the compound mirror 320 (e.g., nearer to the front side of the front rigid body of the HMD 100 than the compound mirror 320). The image capture device captures light transmitted by the compound mirror 320, such as infrared wavelengths of light in various embodiments, and generates images of the user's eye positioned at the exit pupil 330, as further described above in conjunction with FIG. 1.

Figure 4:
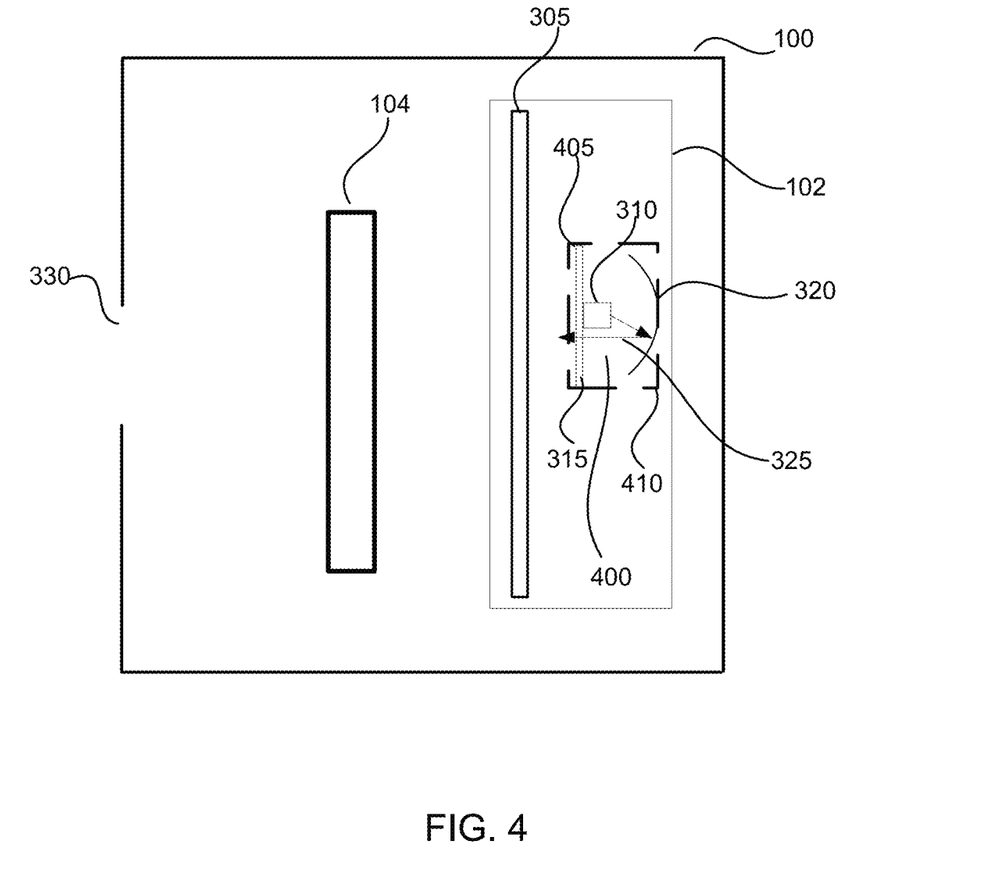
FIG. 4 is a cross-section of a front rigid body of a head mounted display (HMD) including an electronic display element including an alternative reflective illumination source, in accordance with at least one embodiment.

FIG. 4 is a cross-section of a front rigid body of a head mounted display (HMD) 100 including an electronic display element 102 including an alternative reflective illumination source. In the example of FIG. 4, the electronic display element 102 includes a display 305 that obtains content from the console 130 or from another source and presents the content. The electronic display element 102 also includes an illumination source 310 coupled to a partially transparent circuit board 315, as well as a compound mirror 320. However, in other embodiments, the electronic display element 102 may include different or additional components than those shown in conjunction with FIG. 4.

In the example of FIG. 4, the compound mirror 320 is included in an optical material 400. Example optical materials 400 include an inorganic glass (e.g., soda lime or borosilicate), a polymer (e.g., a silicone), an acrylate (e.g., polymethylmethacrylate), an epoxy, a polycarbonate, and a polyolefin (e.g., such as a cyclic polyolefin). In various embodiments, the optical material 400 has a refractive index between 1.2 and 1.9, while in other embodiments the optical material 400 has a refractive index between 1.4 and 1.6. While FIG. 4 shows an embodiment with the compound mirror 320 included in a single optical material 400, in other embodiments, an optical material 400 encloses a surface of the compound mirror 320 nearest the illumination source 310, while a different, alternative, optical material is behind an additional surface of the compound mirror 320 farthest from the illumination source 310. For example, an array of compound mirrors 320 is formed by injection molding a polymer and coating a curved surface of a compound mirror 320 with a suitable reflective material, and filling a surface of the array with a different polymer, such as a cast and ultraviolet or thermally cured resin.

In the embodiment shown by FIG. 4, the illumination source 305 is included in the optical material 400; however, in other embodiments, the illumination source 305 is external to the optical material 400. Alternatively, the illumination source is optically coupled to the optical material 400. In another embodiment, a material having less than a threshold refractive index is between the illumination source 305 and the optical material 400.

The optical material 400 has a surface 405 proximate to the illumination source 310 and an additional surface 410 proximate to a rear surface of the compound mirror 320 (i.e., a surface of the compound mirror farthest from the display 305). In various embodiments, the surface 405 of the optical material 400 is parallel to the additional surface 410 of the optical material 400. The surface 405 and the additional surface 410 are flat and smooth in various embodiments;

alternatively, the surface 405 and the additional surface 410 have any suitable structure to provide at least a threshold amount of light diffusion.

Figure 5:
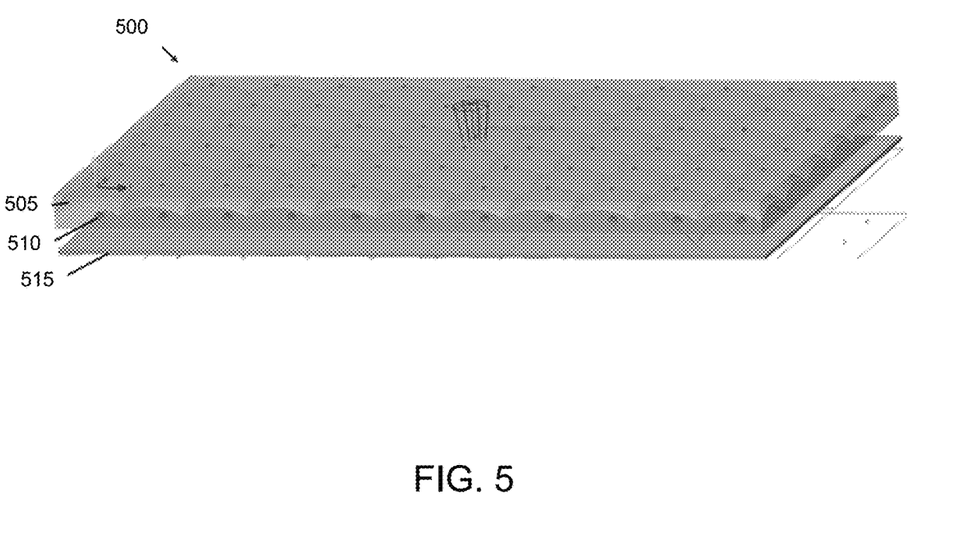
FIG. 5 is an example of an array of reflective illumination sources illuminating a display, in accordance with at least one embodiment.

FIG. 5 is an example of an array 500 of reflective illumination sources illuminating a display 515. The array 500 includes multiple compound mirrors 505 that are each illuminated by a corresponding illumination source 510. As further described above in conjunction with FIGS. 3 and 4, each compound mirror 505 is positioned a distance from a corresponding illumination source 510 that emits light onto the compound mirror 505. Light emitted by an illumination source 510 is reflected by the corresponding compound mirror 505 as a light ray directed towards a portion of a display 515 that is positioned on an opposite side of the illumination source 510 than the compound mirror 505.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A head mounted display (HMD) comprising:
   an electronic display element configured to display content to a user wearing the HMD, the electronic display including:
      an illumination source coupled to a partially transparent circuit board, the illumination source configured to emit light onto a compound mirror positioned a distance from the illumination source;
      the compound mirror, which has curvature in two orthogonal axes that reflects light from the illumination source to form a ray of light directed towards the illumination source and transmitted through the partially transparent circuit board coupled to the illumination source; and
      a display presenting content and positioned so the ray of light transmitted through the partially transparent circuit board is incident on the display; and
   an optics block configured to direct light from the electronic display element to an exit pupil of the HMD.

2. The HMD of claim 1, wherein the illumination source comprises a light emitting diode.

3. The HMD of claim 1, wherein the compound mirror is included in an optical material having a surface proximate to the illumination source and an additional surface proximate to a surface of the compound mirror farthest from the display.

4. The HMD of claim 3, wherein the surface is parallel to the additional surface.

5. The HMD of claim 3, wherein the optical material has a refractive index between 1.2 and 1.9.

6. The HMD of claim 3, wherein the optical material has a refractive index between 1.4 and 1.6.

7. The HMD of claim 1, wherein the electronic display element further includes:
   a quarter-wave retarder positioned between the illumination source and the display, so the ray of light transmitted through the partially transparent circuit board passes through the quarter-wave retarder before reaching the display.

8. The HMD of claim 7, wherein the electronic display element further includes:
   a reflective polarizer positioned between the display and the partially transparent circuit board, so the ray of light transmitted through the partially transparent circuit board passes through the quarter-wave retarder and the reflective polarizer before reaching the display.

9. The HMD of claim 1, wherein the electronic display element further includes:
   a reflective polarizer positioned between the display and the partially transparent circuit board, so the ray of light transmitted through the partially transparent circuit board passes through the reflective polarizer before reaching the display.

10. The HMD of claim 1, wherein the compound mirror reflects visible light and transmits infrared light.

11. The HMD of claim 10, wherein the compound mirror transmits at least 90% of infrared light incident on the compound mirror.

12. The HMD of claim 1, wherein the partially transparent circuit board comprises a transparent substrate and one or more circuit traces each having a ratio of a height of a circuit trace to a width of the circuit trace equaling or exceeding 1.0.

13. The HMD of claim 12, wherein the transparent substrate comprises glass or plastic.

14. A device comprising:
   an illumination source coupled to a partially transparent circuit board, the illumination source configured to emit light onto a compound mirror positioned a distance from the illumination source;
   the compound mirror, which has curvature in two orthogonal axes that reflects light from the illumination source to form a ray of light directed towards the illumination source and transmitted through the partially transparent circuit board coupled to the illumination source; and a display presenting content and positioned so the ray of light transmitted through the partially transparent circuit board is incident on the display.

15. The device of claim 14, wherein the compound mirror is included in an optical material having a surface proximate to the illumination source and an additional surface proximate to a surface of the compound mirror farthest from the display.

16. The device of claim 15, wherein the surface is parallel to the additional surface.

17. The device of claim 15, wherein the optical material has a refractive index between 1.4 and 1.6.

18. The device of claim 14, wherein the illumination source comprises a light emitting diode.

19. The device of claim 14, wherein the compound mirror reflects visible light and transmits infrared light.

20. The device of claim 19, wherein the compound mirror transmits at least 90% of infrared light incident on the compound mirror.

\* \* \* \* \*